United States Patent [19]

Hikawa et al.

[11] Patent Number: 4,870,647
[45] Date of Patent: Sep. 26, 1989

[54] DIGITAL SIGNAL DEMODULATOR

[75] Inventors: Kazuo Hikawa, Mitaka; Yasuo Inoue, Yokosuka, both of Japan

[73] Assignee: Victor Company of Japan, Kanagawa, Japan

[21] Appl. No.: 103,221

[22] Filed: Oct. 1, 1987

[30] Foreign Application Priority Data

Oct. 2, 1986 [JP] Japan ................... 61-234956

[51] Int. Cl.⁴ .............................. G11B 20/18
[52] U.S. Cl. .................... 371/49.1; 360/48; 360/53; 360/57.2
[58] Field of Search ........... 360/53, 29, 30, 39, 360/48, 38.1, 40; 371/49, 39, 64

[56] References Cited

U.S. PATENT DOCUMENTS

| | | | |
|---|---|---|---|
| 4,281,355 | 7/1981 | Wada et al. | 360/53 |
| 4,598,403 | 7/1986 | Odaka | 371/39 |
| 4,622,600 | 11/1986 | Okamoto et al. | 360/48 |
| 4,685,004 | 8/1987 | Takahashi et al. | 360/48 |
| 4,697,212 | 9/1987 | Osawa et al. | 360/48 |
| 4,710,923 | 12/1987 | Nagumo | 371/39 |

FOREIGN PATENT DOCUMENTS 223255  5/1987  European Pat. Off. ......... 371/49
2085206  4/1982  United Kingdom ........... 371/49

Primary Examiner—A. D. Pellinen
Assistant Examiner—Geoffrey S. Evans
Attorney, Agent, or Firm—Fleit, Jacobson, Cohn, Price, Holman & Stern

[57] ABSTRACT

A digital signal demodulator is provided for demodulating a reproduced recorded modulated digital signal which includes a parity code. The recorded modulated digital signal has a data code format which may include both valid used data codes and unused redundant phantom codes as a result of an industry standard code format conversion. The digital signal demodulator includes a redundant portion detection circuit which detects whether unused redundant phantom codes are present in the reproduced modulated digital signal data, a demodulating circuit which demodulates the reproduced modulated digital signal, an error detection circuit which effects an error detection using a parity code in the demodulated digital signal to detect erroneous data in the demodulated signal, and a judgment circuit which, when unused redundant phantom codes are detected in the modulated digital signal data, judges the corresponding demodulated digital signal data to be erroneous irrespective of the result of the parity code error detection operation.

3 Claims, 6 Drawing Sheets

DIGITAL SIGNAL DEMODULATOR

BACKGROUND OF THE INVENTION

The present invention relates to a digital signal demodulator, and more particularly to a demodulator for demodulating a modulated signal which has been reproduced from a recording medium, i.e., a magnetic tape on which signals are recorded at a standard tape speed in conformity with the industry standards for R-DAT, so that the R-DAT, i.e., a rotary magnetic head type digital audio tape recorder, performs a data corrective operation using a parity system to obtain a correct demodulated data.

Various kinds of digital signal recording and reproducing equipment or digital signal reproducing equipment for reproducing purpose have been conventionally known, in which an analog audio signal is subject to digital modulation such as pulse code modulation (PCM) conforming to a known code format and is recorded on a medium. The recorded PCM signal is subject to reproduction when desired. In such a digital signal having been already recorded on the recording medium to be reproduced by digital signal recording-/reproducing equipment or digital signal reproducing equipment, various parity codes are included in order to detect a code error and correct them for restoring the original audio signal even if there exist code errors in the reproduced data due to signal drop out etc. at the time of reproducing. Thus, a parity operation using a parity code added at the time of recording and the data from which the added parity is derived is performed to detect an error of the data to further perform a predetermined corrective operation, thus to correct and restore the original audio signal.

However, the following problem cannot be avoided in such conventional equipment. Also when a lack in a portion of the reproduced signal occurs as drop out etc. due to a surface irregularity of the magnetic tape for example, at the time of reproduction, a noise occurring during the signal lacking period is outputted from a demodulating circuit as a random data signal. Accordingly, there are instances where the random data (noise) is accidentally reproduced as correct data in the parity operation of the error detection and correcting circuit of the subsequent stage, although the data concerned are false data caused by a random data pattern which takes place.

Particularly, in the rotary head type digital audio tape recorder (which will be abbreviated as "R-DAT" hereinafter), since a simple parity system is adopted, namely the parities derived from two symbols of an ID code and a block address only are added to the head portion of each data block, there is a high possibility that the data would be determined as correct data although those data are false in the case of a random error pattern due to the noise.

As described later in detail the R-DAT system employs a subcode which includes 8 symbols as a "pack", and the last symbol in the pack is a parity symbol of a simple parity system derived from the remaining 7 symbols. Also included in the subcode is an error correction code Cl as one of the 8 packs therein. However, in the high tape speed data search mode, or in the case where the error correction code Cl is not used for the purpose of reducing circuit complexity, detecting subcode data errors is solely dependent upon the above described parity symbol. If this is the case, chances are high that false data could be erroneously judged as correct data.

SUMMARY OF THE INVENTION

A digital signal demodulator is provided, according to the present invention, for demodulating a modulated digital signal including a parity code, a code format of said modulated digital signal having phantom codes resulting from a code format conversion in accordance with an industry standard modulation system, said modulated digital signal being recorded on a recorded medium and reproduced therefrom, and said digital signal demodulator comprises: redundant portion detection means for detecting whether or not said phantom codes are included in said modulated digital signal; demodulating means for producing demodulated data by demodulating said modulated digital signal reproduced from the recording medium; error detection means responsive to an output of said demodulating means for effecting a parity operation using said parity code included in said modulated digital signal, thus to detect an error of data; and judgement means for judging said data, wherein when said phantom codes are detected by said redundant portion detecting means, said judgement means judges the demodulated data to be an error irrespective of the a result of error detecting operation by error detection means.

On the other hand, only when it is detected that data is correct as a result of the parity operation performed by the error detection means and when the phantom codes are not detected by the data detection means, the judgement means judges the demodulated data to be correct data.

DETAILED DESCRIPTION OF THE PREFERRED EMBODIMENT

Figure 1:
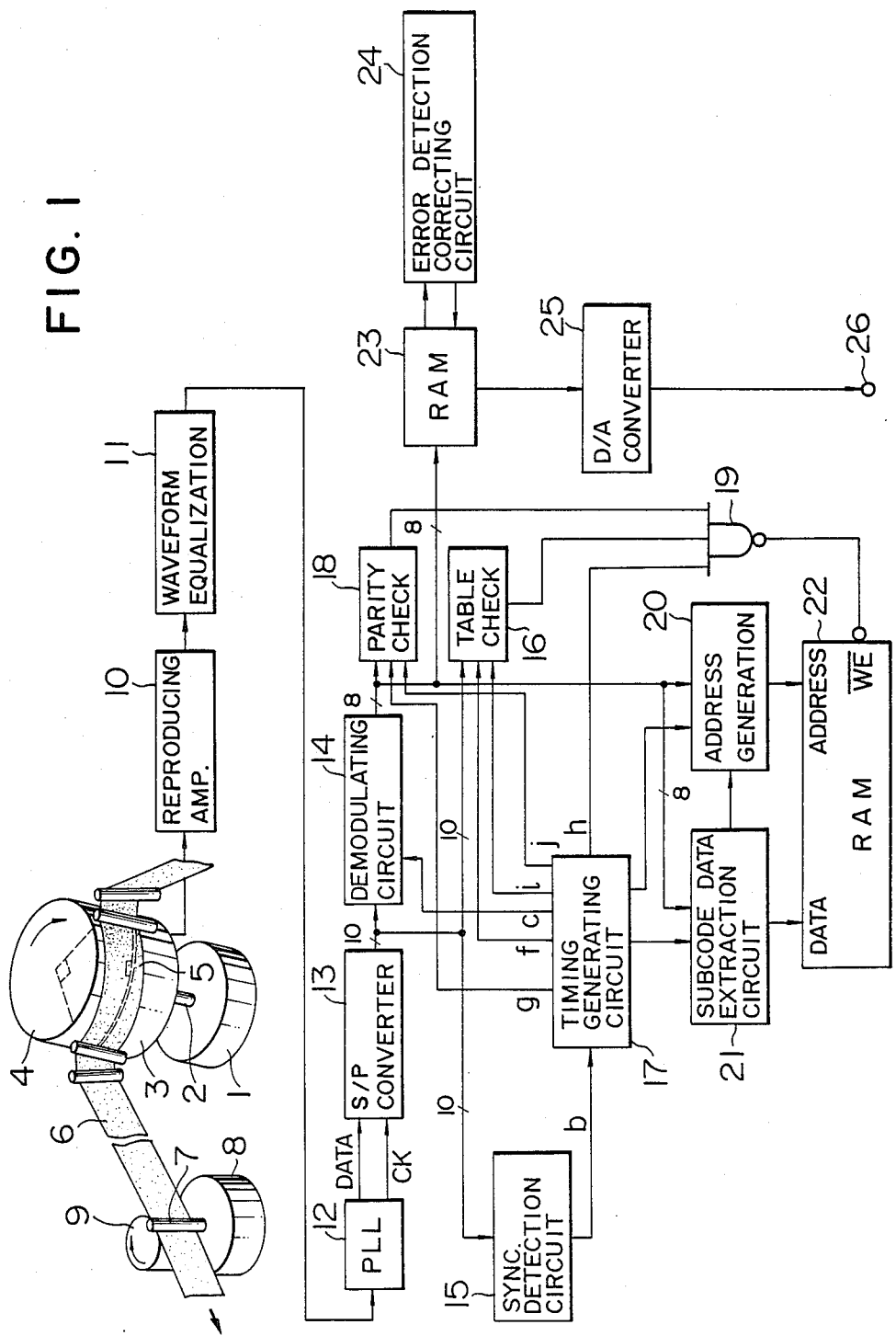
FIG. 1 is a block diagram illustrating an embodiment of a digital signal demodulator according to the present invention.

FIG. 1 is a block diagram illustrating an embodiment of a digital signal demodulator according to the present invention. A rotary shaft 2 of a drum motor 1 is fixed in the central portion of a rotary drum 4 in a manner that it rotatably penetrates into the central portion of a fixed drum 3. On the rotating surface of the rotary drum 4, a rotary head 5 and another rotary head (not shown) opposite thereto are affixed. A magnetic tape 6 is wound on the rotary drum 4 with it being in close contact therewith over an angular range of approximately 90 degrees. Further, the magnetic tape 6 is put between a capstan 7 and a pinch roller 9 and is caused to run in a direction indicated by an arrow. The rotary head 5 and the other rotary head have gaps of which azimuth angles are opposite to each other, and a head width broader than that of the recorded track (e.g., 1.5 times). In the recording, the two heads scan the tape 6 alternately in overlapping relation so that a track once recorded by one head is partially erased by the other head leaving 1/1.5 width tracks on the tape surface having different azimuth angles between two adjacent tracks. These rotary heads are rotated integrally with the rotary shaft 2 and the rotary drum 4. At the time of the standard speed recording/reproducing mode, a rotational speed of the rotary head is selected, e.g., to be about 2000 r.p.m., and at the time the reproducing in the half-speed mode, it is selected, e.g., to be 1000 r.p.m. The running speed of the magnetic tape 6 is selected by the capstan 7 rotated by the capstan motor 8 so that its value at the time of the half-speed mode is one half of that at the time of the standard mode.

Figure 4:
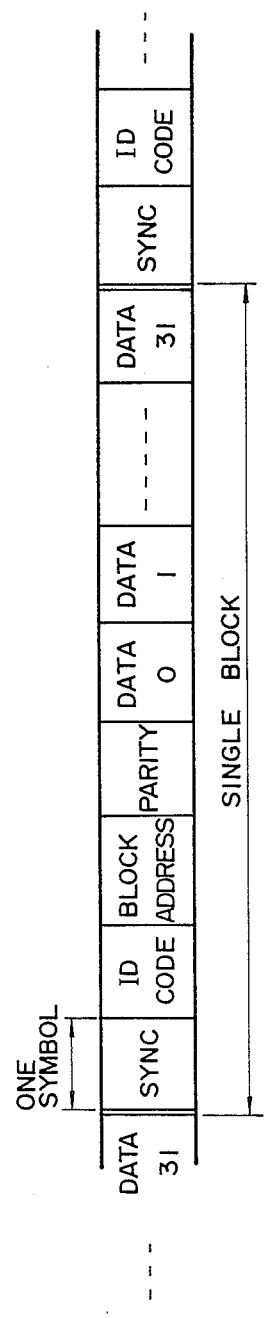
FIGS. 4 to 6 are explanatory views showing examples of signal formats of respective signals to be reproduced in the digital signal demodulator according to the present invention.

The magnetic tape 6 is a prerecorded magnetic tape. On this magnetic tape 6, prerecorded digital signals having a block length of 196 are recorded on each track. Each track includes a PCM data area of 128 blocks and two subcode areas of 8 blocks each respectively arranged so that the PCM data area is interposed in between subcode areas on the track, and the like. FIG. 4 shows the configuration of a single block in the above-mentioned PCM data area. At the first portion of the single block, a synchronizing signal (sync) is arranged. Following this, an ID code, a block address, a parity and PCM data of 32 symbols in total (a single symbol being 8 bits) are arranged in order recited. The PCM data includes digital data obtained by applying pulse code modulation (PCM) to analog audio signals, their parity codes for error detection and correction, and the like. The parity of the fourth symbol is a parity code for detection of error of the ID code and the block address. Accordingly, when demodulated in the reproducing apparatus, if the value of modulo 2 sum in each bit unit of the three parts namely the ID code, the block address and the parity are all equal to zero, it is judged that they are correct.

Figure 5:
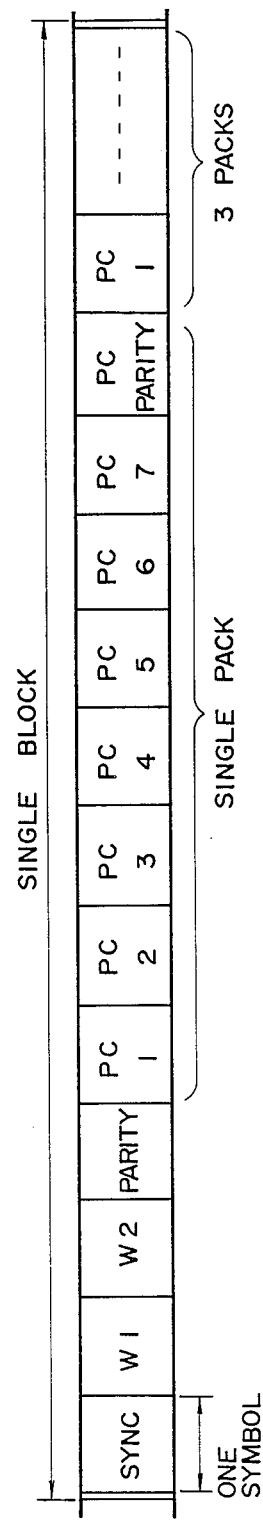

The signal format of a single block of the subcode area has a configuration as shown in FIG. 5. This signal format includes a synchronizing signal (sync), words W1 and W2, a parity, subcode data PC1 to PC7, a PC parity, and the like, each being assigned to the section of 1 symbol. The word W1 and 2nd to 4th bit from MSB of W2 represent an ID code, and 4 bits of the lower order of the word W2 represent a block address. The parity of the fourth symbol is used for detection of an error of the words W1 and W2, and the PC parity is a parity code for detection of an error of the subcode data PC1 to PC7. In this signal format, 8 bytes when demodulated composed of PC1 to PC7 and PC parity are called a "pack" and four packs in total are arranged in a sequential manner in the single block.

Figure 6:
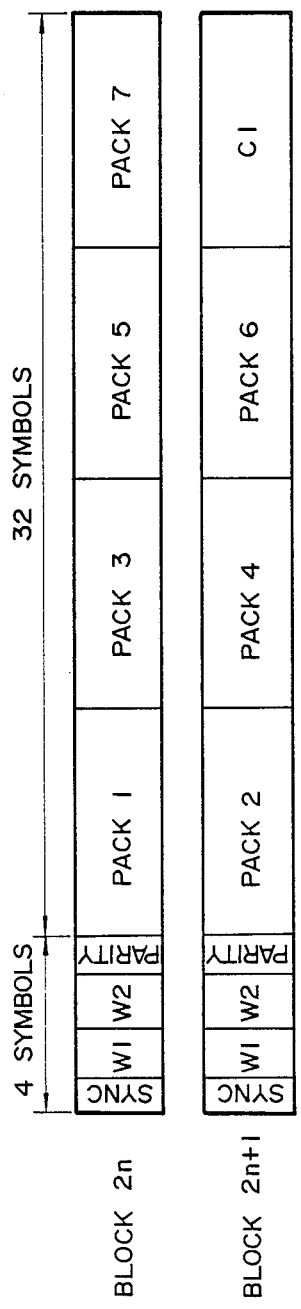

As shown in FIG. 6, the subcode area has a configuration such that data are completed within two consecutive blocks and a C1 code is added as an error detection and correction code to the last one pack of the block $2n+1$ for the packs 1 to 7.

In the above-mentioned signal format, the PCM data and the subcode have symbols of 8 bits each before recording. For the purpose of narrowing the reproducing frequency band for reproduction, and to facilitate the waveform equalization and to eliminate a DC component of the signal for recording, the data are subjected to the 8-10 modulation (Eight to Ten modulation) which will be explained later in detail, generating phantom codes, each symbol is converted to that of 10 bits and is then recorded. It is well known that the 8-10 modulation is a modulation to convert data of 8 bits to that of 10 bits, thus limiting the code length to 1T to 4T (T being a time length of a single data bit).

Figure 7:
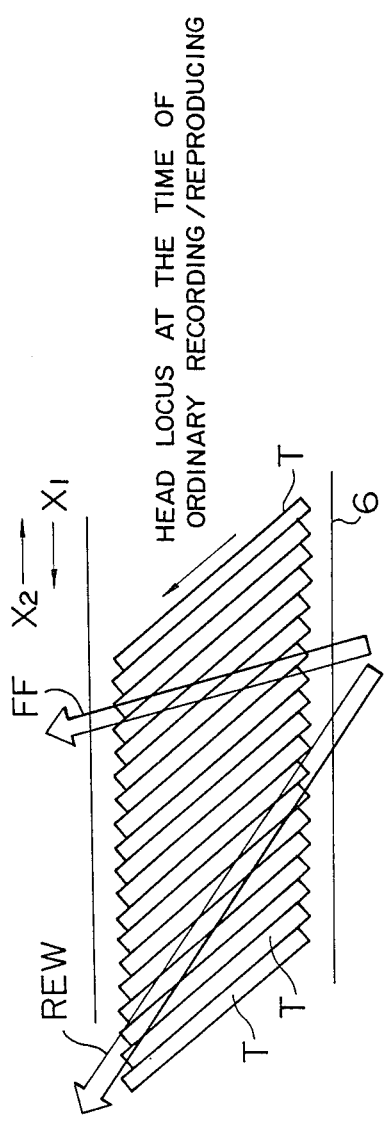
FIG. 7 shows a scanning locus of the head at the time of high tape speed reproducing.

In the case of playing at a high tape speed the above-mentioned recorded magnetic tape 6 on which PCM data or subcode signals having been modulated in accordance with the modulation system stated above and having a format shown in FIGS. 4 to 6 are recorded, two rotary heads such as rotary head 5 etc. depict a scanning locus which scans across a plurality of recording tracks T as shown by FF or REW in FIG. 7, wherein FF represents a scanning locus at the time of the fast forward, e.g., high speed reproduction which effects a reproducing by running the recorded magnetic tape 6 at a high speed in the same direction $X_1$ as that at the time of recording, and REW represents a scanning locus at the time of the rewind, e.g., backward high speed reproduction which effects a reproducing by running the prerecorded magnetic tape 6 at a high speed in a direction $X_2$ opposite to that at the time of recording.

Figure 8:
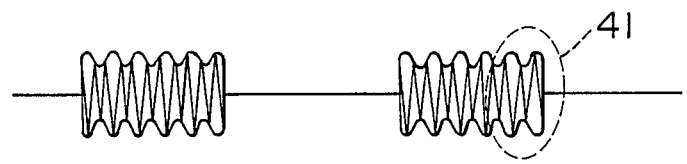
FIG. 8 shows an example of waveforms of a reproduced signal at the time of high tape speed reproducing.
Figure 9:
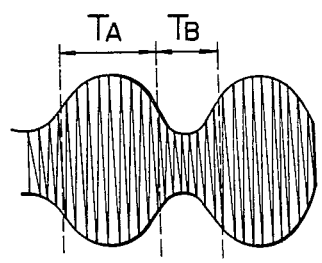
FIG. 9 is a partly enlarged view of the waveforms shown in FIG. 8.

The tracks T on the recorded magnetic tape 6 are those such that adjacent two tracks are successively recorded and formed by two rotary heads having azimuth angles different from each other. By the well known azimuth loss effect, a reproduced signal is obtained by a rotary head having a gap of which the azimuth angle is the same as that at the time of recording. The reproduced output level is low from the rotary head having a gap of which azimuth angle is different from that at the time of recording. The reproduced signal at the time of the above-mentioned high speed reproducing has a waveform as shown in FIG. 8. Because of the 90° angular range contact by two heads, the reproduced signal renders a series of intermittent envelopes. FIG. 9 shows an enlarged view of the waveform portion encircled by dotted lines 41 in FIG. 8. In FIG. 9, a head scans across a plurality of tracks at one scan, the amplitude of the reproduced signal from the head varies as the scanned tracks alternately have different recorded azimuth angles. $T_A$ represents a period where the track azimuth and the head azimuth are close to each other, and $T_B$ represents a period where the azimuth difference is large. In this regard, at the time of high-speed reproduction having a tape speed 200 times larger than an ordinary tape speed, $T_A$ is about 2.6 blocks and $T_B$ is about 1.3 blocks both in forward and backward tape movements. Further, at the time of high-speed reproducing having a speed 50 times larger than an ordinary speed, $T_A$ is about 10.4 blocks and $T_B$ is about 5.2 blocks both in forward and backward tape movements. (The above-mentioned values all indicate the length when the blocks are picked up without interruption as the head scans across the plurality of tracks.)

As described before, the pack of the subcode area completed in two blocks is checked by $C_1$ error correction code. In the case of making such an error correction at the time of high-speed reproduction having a tape speed 200 times larger than an ordinary speed, chances of picking up the data which are determined to be correct data are extremely small (two blocks=72 symbols must be continuously read), resulting in a poor access performance. For this reason, such an error correction must rely upon the simple parity system mentioned before. This is because it is sufficient with the simple parity system because there is a high possibility that the first four symbols within a single block can be continuously read or 8 symbols of PC1 to PC7 and PC parity can be continuously read.

However, even if a number of read data is increased with the simple parity system, the reliability of such data correction system is not high because of the generation of the false data (noise) as described at the beginning. Accordingly, it is required to improve the reliability of the data correction system for a digital signal demodulator thus leading to the present invention.

With the above in view, the present invention has been made. Turning to FIG. 1, a recorded signal on the magnetic tape 6 which has been reproduced by scanning two rotary heads including the rotary head 5 is delivered to a waveform equalization circuit 11 via a rotary transformer (not shown) and a reproducing amplifier 10. After being subjected to a predetermined waveform equalization thereat, the signal thus obtained is delivered to a phase locked loop (PLL) 12. By the PLL 12, the reproduced data and a clock synchronous therewith in phase are taken out. They are delivered to a serial-to-parallel (S/P) converter 13.

The S/P converter 13 converts serial data of 10 bits of the reproduced signal incoming serially as shown in FIG. 3(A) to parallel data of 10 bits to output it at a timing as shown in FIG. 3(D) to deliver it to a demodulating circuit 14, a synchronization detection circuit 15, and a table check circuit 16 which is an essential part of the present invention. The synchronization detection circuit 15 detects a synchronizing signal (labeled SYNC in FIG. 4) in each block signal reproduced from the PCM area and synchronizing signals (labeled SYNC in FIGS. 5 and 6, respectively) in each block signal reproduced from the subcode area to generate a synchronizing signal detection signal b of positive polarity shown in FIG. 3(B) to deliver it to a timing generating circuit 17.

The timing generating circuit 17 is a circuit which generates various kinds of timing control signals on the basis of the input of the detection signal b. The circuit 17 generates an 8-10 conversion timing pulse c shown in FIG. 3(C) to deliver it to the demodulating circuit 14. Further, the circuit 17 generates pulses f and i, and g and j shown in FIGS. 3(F) and 3(I), and FIGS. 3(G) and 3(J) to deliver them to the table check circuit 16 and to a parity check circuit 18, respectively. Furthermore, the circuit 17 generates a pulse h shown in FIG. 3(H) to deliver it to a NAND circuit 19 as a write timing pulse. In addition, the circuit 17 outputs latch pulses etc. to an address generating circuit 20 and a subcode data extraction circuit 21.

Figure 1A:
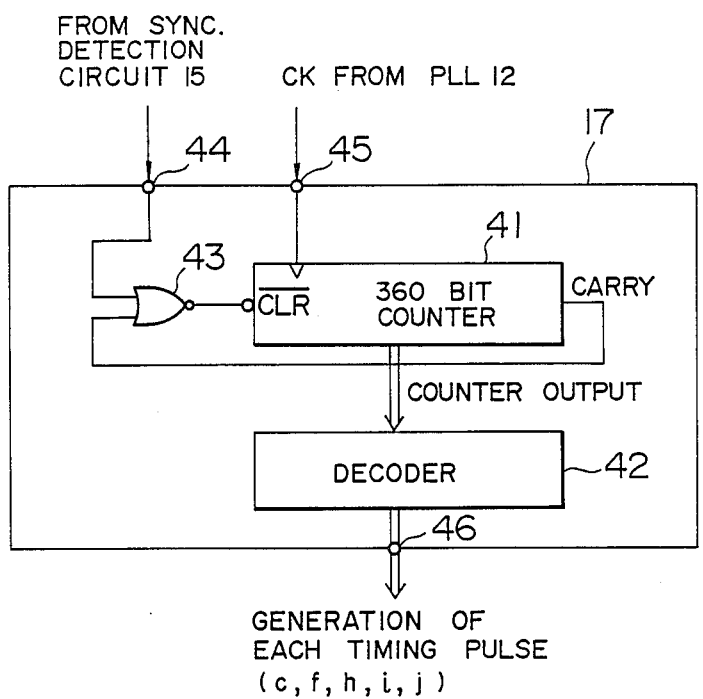
FIG. 1A is a block diagram illustrating an arrangement of a timing generating circuit shown in FIG. 1.

FIG. 1A shows an internal configuration of the timing generating circuit 17. This circuit 17 is composed of a 360 bit counter 41, a decoder 42 and a NOR gate 43.

The 360 bit counter 41 counts a clock CK delivered from the PLL 12 to the input terminal 45 to deliver a count output to the decoder 42. The decoder 42 responds to the count output to form timing pulses c, f, h, i and j to output them from the output terminal 46.

To a clear terminal CLR of the 360 bit counter 41, an output of the NOR gate 43 is delivered. The NOR gate 43 produces an output when the output b of the synchronization detection circuit 15 is delivered via the input terminal 44 or when the 360 bit counter 41 produces a carry output, thus to clear the 360 bit counter 41. Namely, even if the synchronizing signal b is not detected, when a clock CK is delivered for a time period corresponding to a single block (10 bit patterns × 36 symbols), the 360 bit counter 41 begins counting from Φ.

The demodulating circuit 14 effects the 8-10 demodulation which converts data of 10 bits of a modulated digital signal in the input reproduced signal into data of 8 bits thereof to output the demodulated data thus obtained as parallel data of 8 bits at a timing as shown in FIG. 3(E) to deliver it to the parity check circuit 18, the address generating circuit 20, the subcode data extraction circuit 21, and a RAM (random access memory) 23. In data shown in FIGS. 3(A), 3(D) and 3(E), SYNC represents a synchronizing signal indicating the beginning of a block, ID an ID code, BA a block address, P a parity, and BO, etc. data.

The address generating circuit 20 generates and delivers an address signal to the RAM 22. The subcode data extraction circuit 21 latches subcodes in the demodulated data using a latch pulse from the timing generating circuit 17 to deliver data thus obtained (e.g., ID codes, and block address etc.) to the RAM 22. Following application of the pulse j shown in FIG. 3(J) as a clear pulse, the parity check circuit 18 takes in the ID code (ID), the block address (BA) and the parity (P) in the demodulated data shown in FIG. 3(E) to detect the presence or absence of an error of the ID code and the block address on the basis of the above noted data thus taken in. When these data are detected to be correct as a result of the parity check, the parity check circuit 18 produces a signal of high level to deliver it to the NAND circuit 19.

The reproduced modulated digital signal is a signal modulated in accordance with the 8-10 modulation system of the industry standards for R-DAT. This modulation system is a system to represent original 8-bit data with 362 kinds of 10-bit codes, excepting a synchronizing code. For this reason, there exist $(2^{10} - 362)$ phantom codes which are not actually used for representing the original audio signal, and which are thus redundant.

In the present invention, the table check circuit 16 determines whether or not the above noted unused phantom codes (viz., data of the redundant portion of the 8-10 modulation system) are present in the demodulated digital signal. When the phantom code, i.e., the data of the redundant portion is detected to be present, it is unconditionally judged that error is obvious irrespective of a result of the parity check performed by the parity check circuit 18.

Figure 2:
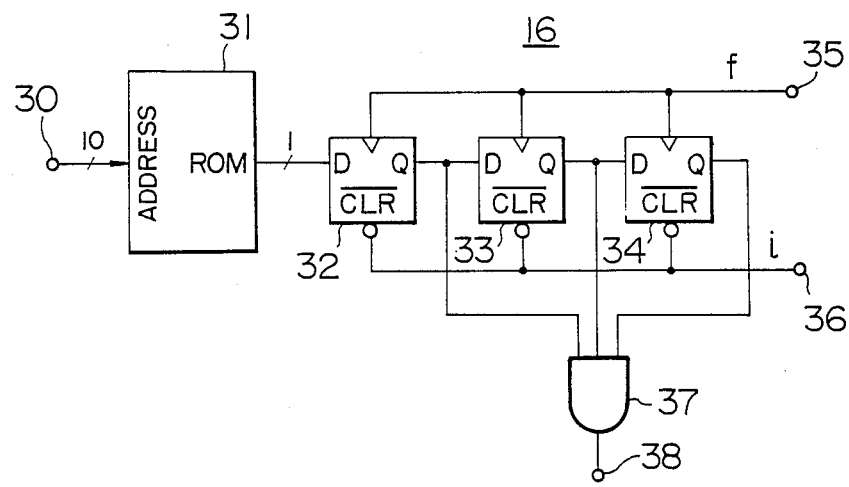
FIG. 2 is a circuit diagram illustrating a table check circuit shown in FIG. 1.

The table check circuit 16 has a circuit arrangement, e.g., as shown in FIG. 2. The reproduced modulated digital signal from the S/P converter 13, which has been input to the input terminal 30, is input to a read only memory (ROM) 31 as an address signal. In this ROM 31, $2^{10}$ kinds of codes obtained by the 8-10 conversion are all memorized as a table in advance. In memory areas of addresses corresponding to 362 kinds of data of 10 bits which are used, data of "1" are memorized. In contrast, in memory areas of addresses corresponding to $(2^{10} - 362)$ kinds of data of 10 bits which are not fundamentally used, data of "0" are memorized. When an input modulated digital signal corresponds to any one of the 362 kinds of data which can be used, a signal of high level is output from the ROM 31, while when otherwise, a signal of low level is output therefrom.

An output signal of the ROM 31 is applied to a data input terminal of a D-type flip-flop 32. D-type flip-flops 32, 33 and 34 are cascade-connected to constitute a shift register of three stages. To the clock terminal of each stage, the pulse f is applied from the timing generating circuit 17 through the input terminal 35. In addition, to the clear terminal of each stage, the pulse i is applied as a clear pulse from the timing generating circuit 17 through the input terminal 36.

The pulse f is produced, as shown in FIG. 3(F), in correspondence with each input period of the ID code, the block address and the address of each block of a reproduced modulated digital signal (shown in FIG. 3(D)) incoming to the input terminal 30 when the subcodes of the PCM area are reproduced. Thus, respective Q output signals of the D-type flip-flops 32, 33 and 34 show checked results as to whether or not three symbols of parity, block address and ID code correspond to data of the redundant data. Accordingly, by outputting respective Q output signals of these D-type flip-flops 32, 33 and 34 to the output terminal 38 via the AND circuit 37, only when the above three symbols correspond to substantial modulated data, a signal of high level is taken out on the output terminal 38, while when any one symbol corresponds to data of the redundant portion, a signal of low level as an error signal is taken out on the output terminal 38. In this example, the sync pattern is judged to be error data.

The signal taken out from the output terminal 38 is delivered to the NAND circuit 19 shown in FIG. 1 as an output signal of the table check circuit 16. At this circuit 19, the not (i e. inverted) logical product of the output signal of the table check circuit 16 and an output signal of the parity check circuit 18 and such product of the former and a pulse h produced only at a timing of the data B0 of the output demodulated data (shown in FIG. 3(E)) of the demodulating circuit 14 as shown in FIG. 3(H) are taken, respectively. Then, an output signal from the NAND circuit 19 is applied to the RAM 22 as a write pulse.

Further, instead of the table check circuit 16 shown in FIG. 2, a conventional decoding circuit can perform the same function, i.e., detecting the phantom codes.

Accordingly, only when it has bee judged that data is correct simultaneously by both the parity check and the table check, a write signal of negative polarity is applied from the NAND circuit 119 to the RAM 22 at timing of the pulse h, thus writing the subcode data into the RAM 22. In contrast, when it has been judged that at least any one of the above three symbols is erroneous as a result of the table check, the output signal of the table check circuit 16 shifts to low level. Thus, a write signal of negative polarity is not outputted irrespective of the result of the parity check, thus to inhibit writing the subcode data into the RAM 22.

The demodulated data is parallelly delivered to the RAM 23, at which it is written thereinto. Then, the data thus written is read once and is delivered to the error detection correcting circuit 24. At this circuit 24, the known error detection corrective operation is performed in regard to the PCM data and is then written into the RAM 23 for a second time. The demodulated data which has undergone operations, e.g., time axis expansion, deinterleaving, and jitter absorption etc. by the RAM 23 and has been read therefrom is delivered to D/A (digital-to-analog) converter 25. At this D/A converter 25, the above-mentioned demodulated data is subjected to digital-to-analog conversion so that it is restored to an analog audio signal. The analog audio signal thus obtained is output to the output terminal 26.

Figure 3:
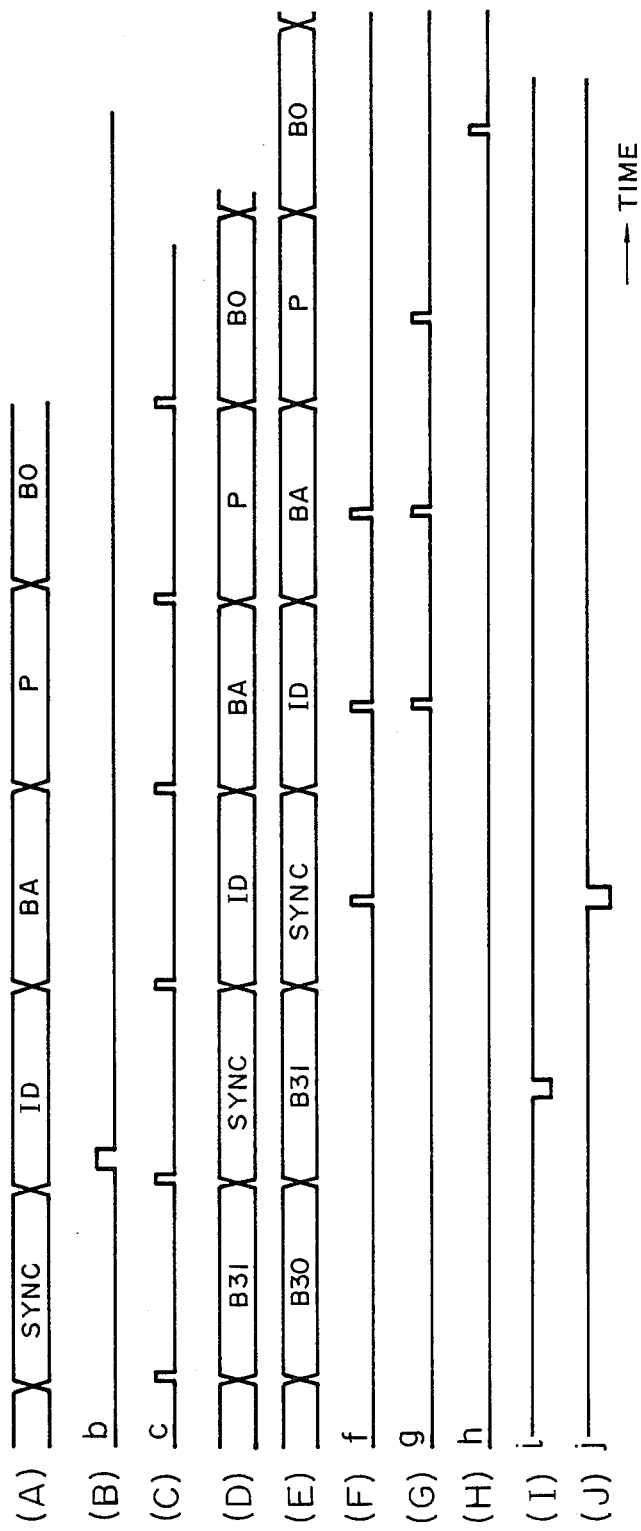
FIG. 3 is a time chart for explanation of the operation in the PCM area shown in FIGS. 1 and 2.

It has been described that the table check circuit 16 shown in FIG. 3 functions to conduct a table check for three symbols of ID code, block address and parity. Instead of using these ID, block address and parity codes, such a table check can be conducted also with three symbols of W1, W2 and parity shown in FIGS. 5 AND 6 of each block reproduced from the subcode area in the same manner as stated above. In this case, the above-mentioned pulse h is outputted at timing of data B0 and B1 in the demodulated data shown in FIG. 3(E). This is because it is required to reproduce both W1 and W2. Thus, it is possible to reduce to a large extent the possibility that an erroneous data signal would be judged as a correct one resulting from the fact that the parity check is accidentally judged all correct.

The present invention is not limited to the above-mentioned embodiment. For example, a table check may be similarly carried out for data of a single pack indicated by PC1 to PC7 and parity in FIG. 5 in each block reproduced from the subcode area. In this case, it is required for the shift register within the table check circuit 16 to have eight stages.

As described above, in accordance with the present invention, in the case where a judgement is made as to whether or not reproduced data is correct only by the simple parity check as in the case that a reproduced signal is partially lost due to drop-out, at the time of high-speed reproducing, or in the case that error correction by C1 code is not conducted, it is possible to reduce to a large extent the probability that the result of the parity check is judged to be all correct accidentally, so that an erroneous data would be judged to be correct data, thus advantageously making it possible to improve the reliability of the reproduced data by the simple parity.

What is claimed is:

1. A digital signal demodulator for demodulating a modulated digital signal which modulated digital signal includes a parity code, a code format of said modulated digital signal including both valid used codes and invalid unused redundant phantom codes resulting from a code format conversion in accordance with an industry standard modulation system, said modulated digital signal being recorded on a recording medium and reproduced therefrom, said digital signal demodulator comprising:

redundant portion detection means for detecting whether or not said unused redundant phantom codes are included in said modulated digital signal, said redundant portion detection means including:
a ROM in which all of $2^m$ codes kinds of codes obtainable by an n-to-m code format conversion are memorized as a table in which said $2^m$ codes are classified into valid used codes and unused redundant phantom codes, said ROM, in response to a reproduced modulated digital signal input thereto as an address signal, producing an output signal indicating whether or not said reproduced modulated digital signal input thereto is a valid used code or an unused redundant phantom code; and
a detection circuit which receives the output signal from the ROM and which produces an output signal when an unused redundant phantom code is included in the reproduced modulated digital signal input to the ROM;

demodulating means for demodulating said modulated digital signal reproduced from said recording medium and for outputting a demodulated digital signal corresponding thereto;

error detection means receiving the demodulated digital signal from the demodulating means, for effecting a parity check operation on said demodulated digital signal by using a parity code included in the demodulated digital signal to detect a data error therein; and judgement means for judging the validity of data in said demodulated digital signal, said judgement means receiving the output signal from said detection circuit, wherein, when unused redundant phantom codes are detected in the reproduced modulated digital signal by the redundant portion detection means, said judgement means judges the corresponding demodulated digital signal to be erroneous data irrespective of a result of the error detecting parity check operation effected by the error detection means.

2. A digital signal demodulator according to claim 1, wherein said detection circuit of said redundant portion detection means comprises:

a shift register having at least three stages of flip-flop circuits, output signals from said ROM being sequentially input to said shift register; and AND circuit means operably connected to said shift register for detecting whether the output signals from said ROM applied to said shift register indicate valid used codes or unused redundant phantom codes in the corresponding reproduced modulated digital signal input to said redundant portion detection means.

3. A digital signal demodulator for demodulating a modulated digital signal which modulated digital signal includes a parity code, a code format of said modulated digital signal including both valid used codes and invalid unused redundant phantom codes resulting from a code format conversion in accordance with an industry standard modulation system, said modulated digital signal being recorded on a recording medium and reproduced therefrom, said digital signal demodulator comprising:

redundant portion detection means for detecting whether or not said unused redundant phantom codes are included in said modulated digital signal, said redundant portion detection means including a decoder means for decoding said phantom codes;

demodulating means for demodulating said modulated digital signal reproduced from said recording medium and for outputting a demodulated digital signal corresponding thereto;

error detection means receiving the demodulated digital signal from the demodulating means, for effecting a parity check operation on said demodulated digital signal by using a parity code included in the demodulated digital signal to detect a data error therein; and judgement means for judging the validity of data in said demodulated digital signal, said judgement means receiving the output signal from said detection circuit, wherein, when unused redundant phantom codes are detected in the reproduced modulated digital signal by the redundant portion detection means, said judgement means judges the corresponding demodulated digital signal to be erroneous data irrespective of a result of the error detecting parity check operation effected by the error detection means.

* * * * *